United States Patent [19]
Berger et al.

[11] Patent Number: 6,160,818
[45] Date of Patent: *Dec. 12, 2000

[54] TRAFFIC MANAGEMENT IN PACKET COMMUNICATION NETWORKS HAVING SERVICE PRIORITIES AND EMPLOYING EFFECTIVE BANDWIDTHS

[75] Inventors: Arthur W. Berger, Fair Haven; Ward Whitt, Basking Ridge, both of N.J.

[73] Assignee: AT &T Corp, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/895,641

[22] Filed: Jul. 17, 1997

[51] Int. Cl.$^7$ ............................... H04J 3/16; G01R 31/08
[52] U.S. Cl. ......................... 370/468; 370/232; 370/233; 370/230
[58] Field of Search .................................... 370/230, 231, 370/232, 235, 236, 237, 412, 462, 468, 477, 428

[56] References Cited

U.S. PATENT DOCUMENTS

| | | | |
|---|---|---|---|
| 5,040,176 | 8/1991 | Barzilai | 370/422 |
| 5,121,383 | 6/1992 | Golestani | 370/235 |
| 5,233,604 | 8/1993 | Ahmadi | 370/238 |
| 5,267,232 | 11/1993 | Katsube | 370/230 |
| 5,289,462 | 2/1994 | Ahmadi et al. | 370/232 |
| 5,309,433 | 5/1994 | Cidon | 370/390 |
| 5,311,513 | 5/1994 | Ahmadi | 370/230 |
| 5,313,454 | 5/1994 | Bustini | 370/231 |
| 5,347,511 | 9/1994 | Gun | 370/255 |
| 5,359,593 | 10/1994 | Derby | 370/234 |
| 5,367,523 | 11/1994 | Chang | 370/235 |
| 5,408,465 | 4/1995 | Gusella | 370/231 |
| 5,434,848 | 7/1995 | Chimento | 370/232 |
| 5,521,971 | 5/1996 | Key et al. . | |
| 5,687,167 | 11/1997 | Bertin | 370/254 |
| 5,719,854 | 2/1998 | Choudhury | 370/231 |
| 5,781,624 | 7/1998 | Mitra | 379/244 |
| 5,790,522 | 8/1998 | Fichou | 370/236 |
| 5,828,653 | 10/1998 | Goss | 370/230 |
| 5,838,663 | 11/1998 | Elwalid | 370/233 |

OTHER PUBLICATIONS

R. Bolla, et al., "Adaptive Access Control of Multiple Traffic Classes in ATM Networks", Globecom '91.

*Primary Examiner*—Douglas W. Olms
*Assistant Examiner*—Ricardo M. Pizarro

[57] ABSTRACT

A method is provided for admitting new requests for service in a shared resource having a capacity. The new request has service priority levels associated therewith. In one embodiment of the invention, for example, the shared resource may be a packet communications network and the service request may be a request to admit a new connection. The method proceeds as follows. First, for each service priority level on said shared resource, a total effective bandwidth is generated which is represented by a sum of individual effective bandwidths of previously admitted requests for service. Subsequent to receiving a new request for service having a specified priority of service level, a plurality of effective bandwidths are accessed for the new request. The plurality of effective bandwidths are respectively associated with the specified service priority level and service priority levels therebelow. The new request is admitted if, for the specified service priority level and for each service priority level therebelow, the sum of (i) said total effective bandwidth for a given service priority level and (ii) for said new request, the effective bandwidth at the given service priority is less than the capacity.

29 Claims, 4 Drawing Sheets

TRAFFIC MANAGEMENT IN PACKET COMMUNICATION NETWORKS HAVING SERVICE PRIORITIES AND EMPLOYING EFFECTIVE BANDWIDTHS

BACKGROUND OF THE INVENTION

Emerging high-speed communication networks, such as broadband ISDN networks that employ ATM technology, tend to be packet networks rather than circuit-switched networks because the packet structure allows for better resource sharing. In a packet network, sources do not require dedicated bandwidth (e.g., circuits) for the entire duration of a connection. Unfortunately, however, the enhanced flexibility of packet networks also makes it more difficult to effectively control the admission of connections seeking to enter an existing network and to plan the capacity of future networks when they are designed.

The problems of admission control and capacity planning in a packet network may be addressed by a concept known as the "effective bandwidth" or "equivalent bandwidth" of a connection. When employing this concept, an appropriate effective bandwidth is assigned to each connection and each connection is treated as if it required this effective bandwidth throughout the active period of the connection. The feasibility of admitting a given set of connections may then be determined by ensuring that the sum of the effective bandwidths is less than or equal to the total available bandwidth (i.e., the capacity). By using effective bandwidths in this manner, the problems of admission control and capacity planning are addressed in a fashion similar to that employed in circuit-switched networks. Additional details concerning effective bandwidths may be found in U.S. Pat. Nos. 5,289,462 and 5,521,971, for example.

It is often desirable to provide different quality of service (QOS) guarantees to different classes of customers who use a communication network. Network nodes have been designed that partition the connections established on a link into different priority levels, whereby all of the packets queued from connections of a given priority are emitted prior to any packets from connections of a lower priority. Accordingly, allocation of network resources based on different priority levels is becoming a realistic possibility. Known admission control methods which use the effective bandwidth concept, however, assume that the network nodes operate on a First-In-First-Out (FIFO) basis.

It is therefore desirable to employ effective bandwidths for admission control and capacity planning which can account for priorities of service at the network nodes.

SUMMARY OF THE INVENTION

In accordance with the present invention, a method is provided for admitting new requests for service in a shared resource having a capacity. The new request has service priority levels associated therewith. In one embodiment of the invention, for example, the shared resource may be a packet communications network and the service request may be a request to admit a new connection. The method proceeds as follows. First, for each service priority level on said shared resource, a total effective bandwidth is generated which is represented by a sum of individual effective bandwidths of previously admitted requests for service. Subsequent to receiving a new request for service having a specified priority of service level, a plurality of effective bandwidths are accessed for the new request. The plurality of effective bandwidths are respectively associated with the specified service priority level and service priority levels therebelow. The new request is admitted if, for the specified service priority level and for each service priority level therebelow, the sum of (i) said total effective bandwidth for a given service priority level and (ii) for said new request, the effective bandwidth at the given service priority is less than the capacity.

Various embodiments of the invention also encompass methods for releasing a request for service and a method for dimensioning the capacity of the shared resource.

DETAILED DESCRIPTION

Figure 1:
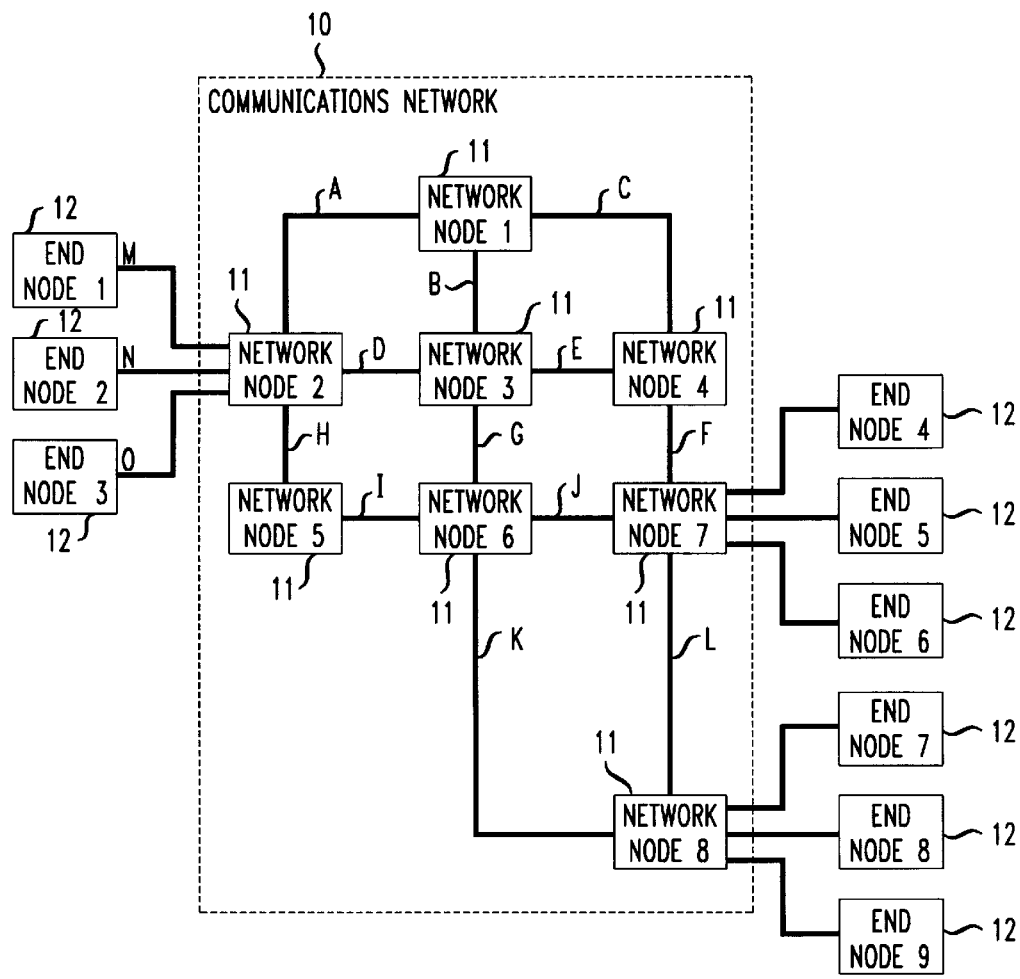
FIG. 1 shows a simplified block diagram of a packet transmission system.

Referring more particularly to FIG. 1, there is shown a general block diagram of a packet transmission system 10 comprising eight network nodes 11 numbered 1 through 8. Each of network nodes 11 is linked to others of the network nodes 11 by one or more communication links A through L. Each such communication link can support multiple connections, which in turn may be either semi-permanent connections or selectively enabled (dial-up) connections. Any or all of network nodes 11 may be attached to end nodes, network node 2 being shown as attached to end nodes 1, 2 and 3, network node 7 being shown as attached to end nodes 4, 5 and 6, and network node 8 being shown as attached to end nodes 7, 8 and 9. Network nodes 11 each comprise a data processing system which provides data communications services to all connected nodes, network nodes and end nodes, as well as decision points within the node. The network nodes 11 each comprise one or more decision points within the node, at which incoming data packets are selectively routed on one or more of the outgoing communication links to another node. Such routing decisions are made in response to information in the header of the data packet. The network node also provides ancillary services such as the calculation of routes or paths between terminal nodes, providing access control to packets entering the network at that node, and providing directory services and maintenance of network topology data bases used to support route calculations.

The steps involved in establishing a connection between two nodes in transmission system 10 include bandwidth allocation, path selection, admission control, and call setup. Bandwidth allocation and admission control are accomplished by determining the "effective bandwidth" of the connection to be established. The effective bandwidth of a connection assesses the loading that the new connection will generate, based on the traffic characteristics of the source and the desired quality of service. The transmission system assumes that the connection will require the effective bandwidth throughout its duration.

U.S. Pat. No. 5,289,462 provides one method that may be used to calculate the effective bandwidth of a connection (see equation 2 of the patent). However, as previously noted, this known technique does not take into account different priority levels that may be assigned to the connections. Rather, this reference simply employs FIFO service.

Figure 2:
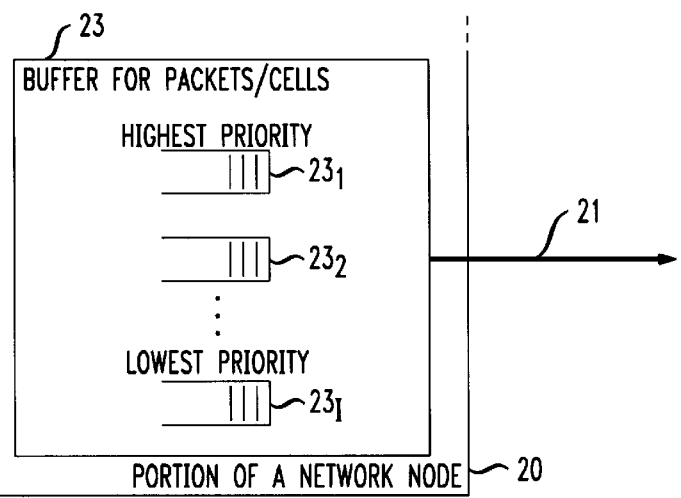
FIG. 2 shows a block diagram of a network node configured to supply packets to an outgoing link based on priority levels that are assigned to each connection.

FIG. 2 shows a block diagram of a network node 20 configured to supply packets to an outgoing link 21 based on the assigned priority level of each connection. The node 20 includes a buffer 23 for queuing the connections. Queue 1 in buffer 23 has the highest priority and packets are supplied from this queue onto link 21 in a FIFO order until the queue is empty. When queue 1 is empty, packets are supplied from queue 2 in a FIFO order as long as queue 1 remains empty. The process continues until the lowest priority queue (queue 1) is reached, which will occur when all higher priority queues have been emptied. One of ordinary skill in the art will recognize that the queues 1, 2, . . . , I may be physically realized in a single buffer or in separate buffers. In current packet switches typical implementations of service priorities have two to four priority levels (I would equal 2 to 4), though the invention pertains for an arbitrary number of priority levels.

To account for service priorities, the invention assigns each connection (other than those in the lowest priority) multiple effective bandwidths: one for the priority-of-service level of the given connection and one for each lower priority level. The individual effective bandwidths can be calculated in accordance with known procedures employing a FIFO discipline. For purposes of illustration, the present invention will be described in what follows for the case of a single resource. One of ordinary skill in the art will recognize that the invention also encompasses situations involving two or more resources.

Prior art applied to a node with service priorities would assign a single effective bandwidth to each connection. In particular, let $e_{ij}$ represent the effective bandwidth required by a connection having a priority i (lower indices have higher priority so that priority 1 has the highest priority) and characteristics of a source type j, and let $n_{ij}$ be the number of connections of priority i and source type j. The number of priority levels is denoted by I. The number of source types having priority i is denoted by $J_i$. If the capacity of a link is denoted by C, then the following inequality constraint would be used by prior art:

$$\sum_{i=1}^{I}\sum_{j=1}^{J_i} e_{ij} n_{ij} \leq C \qquad (1)$$

The set of numbers $n_{ij}$ of connections satisfying this inequality is referred to as the admissible set.

The present inventors have recognized that inequality constraint (1) is unnecessarily conservative. A significant improvement can be obtained by, first, having a separate inequality constraint for each priority level and, second, by assigning different effective bandwidths to the same connection to be used in the different inequality constraints. That is, the single inequality constraint (1) should be replaced by the set of I inequality constraints:

$$\sum_{i=1}^{k}\sum_{j=1}^{J_i} e_{ij}^k n_{ij} < C \quad \text{for each priority level } k, k = 1, \ldots, I \qquad (2)$$

where $e_{ij}^k$ is the effective bandwidth of an (i,j) connection (that is, a connection of source type j and priority level i) as seen by priority k, and C is the capacity of the link. In other words, a given connection may be assigned several effective bandwidths—one effective bandwidth for the priority of service level of the given connection and one effective bandwidth for each lower priority level. It should be noted that for some service types distinct effective bandwidths for all lower priorities may yield only modest efficiency gains, in which case to reduce complexity, for a given (i, j) connection the values of the effective bandwidth $e_{ij}^k$ may be the same for different values of the priority k. The admissible set associated with (2) is the set of numbers $n_{ij}$ of connections satisfying all I inequalities in (2). At first glance, the I inequality constraints in (2) might seem more restrictive than the single inequality constraint in (1). However, if $e_{ij}^k \leq e_{ij}$ for all i, j, and $k \leq i$, where $e_{ij}^k$ is in (2) and $e_{ij}$ is in (1), as should typically be the case in practice, then the new admissible set in (2) is at least as large as the admissible set in (1). In fact, the inventors have shown that the admissible set for (2) can be much larger than the admissible set for (1).

The previously described admissible sets apply to the case of a single resource (e.g., link). However, a connection may require multiple resources. In such cases the connection must satisfy the inequality constraints associated with all its required resources.

The effective bandwidth for FIFO service such as discussed in the previously mentioned patent does not depend on whether the performance criterion is specified in terms of loss or delay. Loss is typically modeled in terms of the probability that the queue length is greater than a specified threshold in an infinite-capacity buffer. When the concept of priorities is employed, however, the effective bandwidth does depend on whether the performance criterion is based on loss or delay. For all but the highest priorities, the work-in-system (which represents the queue length for constant size packets) can be significantly smaller than the delay because the processing of work can be interrupted by arrivals from a higher priority connection. The present invention will be illustrated with a performance criterion based on loss. However, one of ordinary skill in the art will recognize that the present invention may be adapted to situations in which the performance criterion is based on delay.

The required effective bandwidths $e_{ij}^k$ can be determined by a variety of methods. In accordance with one embodiment of the present invention, an approach based on large buffer asymptotics will now be described. For purposes of the following discussion, the performance criterion is modeled on the workload in a hypothetical infinite-capacity system being above a threshold $b_i$ with a probability no more than $p_i$, where $b_i$ represents the capacity of the buffer for priority i in the node. That is, the priority-i criterion based on loss may be represented by:

Probability (priority-i workload>$b_i$)<$p_i$, i=1, . . . I    (3)

Based on simplifying assumptions, the effective bandwidth satisfying this loss criterion may be expressed as follows:

$$e_{ij}^k = \begin{cases} 0, & i > k \\ \psi_{A_{ij}}(\eta_k^*)/\eta_k^*, & i \leq k \end{cases} \qquad (4)$$

where $n^*_k$ is called the effective priority-k criterion and is set equal to $-\log(p_k)/b_k$ and $$\psi_{A_{ij}}(\theta) = \lim_{t \to \infty} t^{-1} \log E e^{\theta A_{ij}(t)} \qquad (5)$$

and $A_{ij}(t)$ is the input of work of an (i,j) connection during the interval [0, t]. Equation (4) will be referred to as the empty-buffer effective bandwidth (EBEB) approximation. It should be emphasized that (3)–(5) provides only one way to obtain the required effective bandwidth. The present invention contemplates the use of alternative methods as well.

Figure 3:
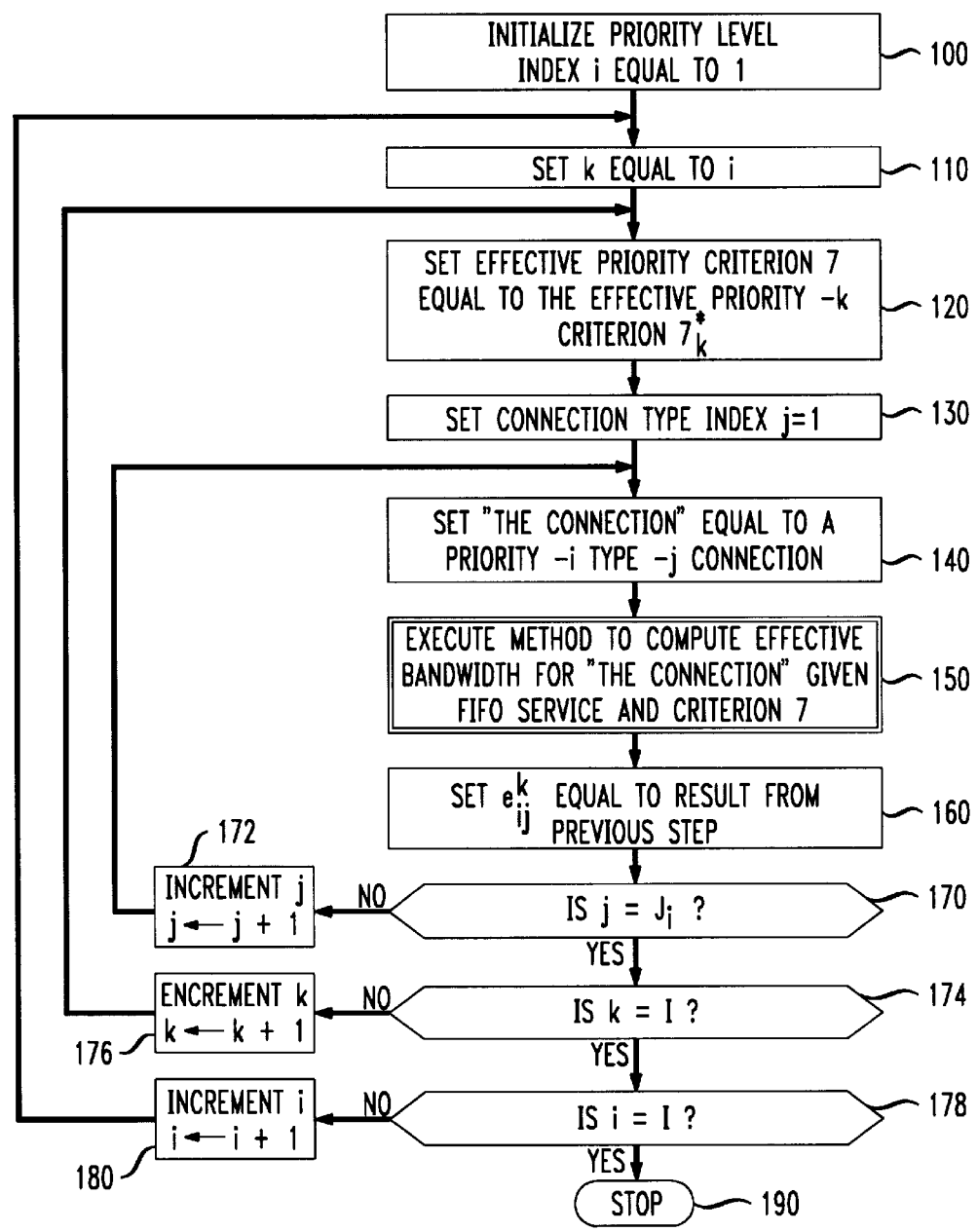
FIG. 3 shows a flow chart of an exemplary method for calculating effective bandwidths in accordance with the present invention.

FIG. 3 shows an example of the inventive method for determining the effective bandwidth given different priorities of service. The results of this method, which yield a series of numerical values for $e_{ij}^k$, may be calculated offline and stored for subsequent retrieval on an as-needed basis. As shown in the figure, the priority level index i is initialized to one (step 100), and the index k is set equal to i (step 110). The effective priority criterion $\eta$ is set equal to the effective priority-k criterion, i.e., $\eta = \eta^*_k$ (step 120), and the index j denoting the connection type is set equal to one (step 130). The particular effective bandwidth to be calculated is for connection (i,j) as seen by priority k (step 140). The effective bandwidth $e^{ijk}$ is calculated in accordance with known techniques employing FIFO service, such as shown by equation 2 in U.S. Pat. No. 5,289,462, for example (steps 150 and 160). The process continues through steps 170–180 by repeating steps 110–160 until values of the effective bandwidth $e_{ij}^k$ have been calculated for all values of i, j and k.

Figure 4:
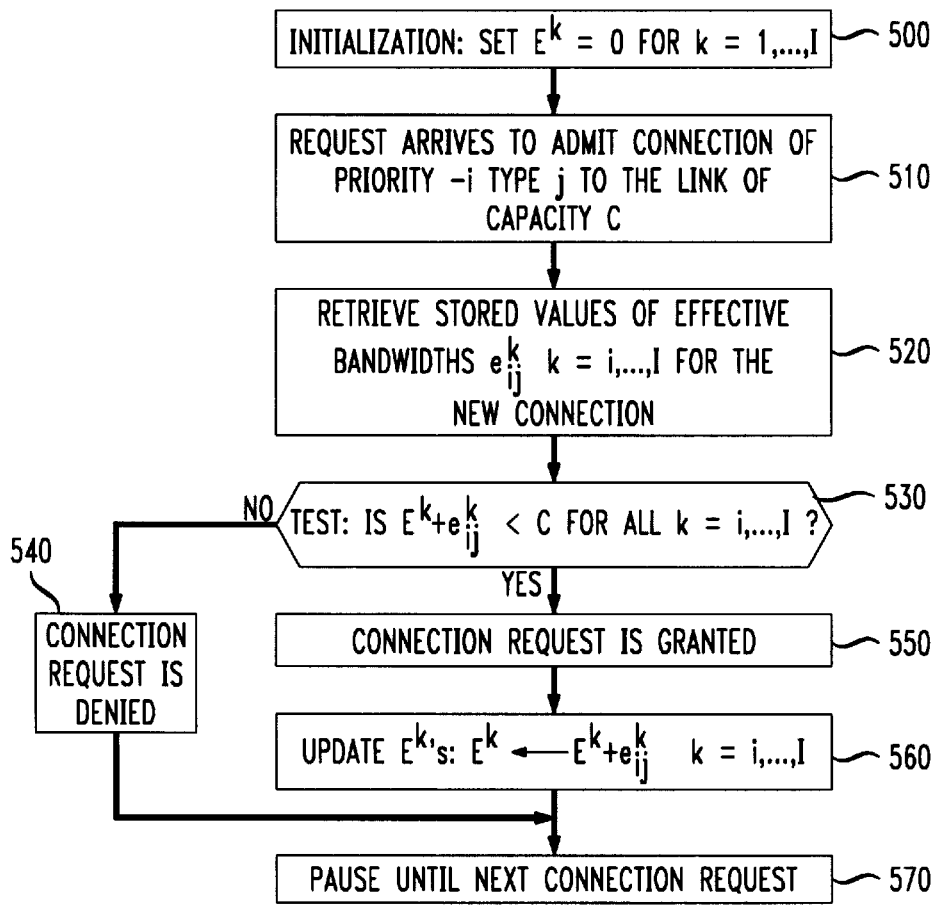
FIG. 4 shows a flowchart of an exemplary method for admitting a connection in accordance with the present invention.

FIG. 4 shows a flowchart of an exemplary method for admittance of connections on a link from a network node. The method employs the effective bandwidths that have been calculated by the method of FIG. 3. A value $E_k$ is defined, which equals the sum of the effective bandwidths of connections that are currently admitted to the network with a priority k. The value of $E_k$ is initially set to zero. (step 500). Upon receiving a request to admit a connection of priority i, type j, (step 510), the previously determined values of the effective bandwidths $e_{ij}^k$, k=i, . . . I, for this connection is retrieved from a database (step 520). The connection will be admitted to the network if the following (I−i+1) inequalities are satisfied: $E_k + e_{ij}^k < C$ for all k=i, . . . , I (step 530). If the inequalities are not satisfied, the connection request is denied (step 540). If the inequalities are satisfied, the connection request is granted (step 550) and the value of $E_k$ is updated for k=i, . . . , I to the reflect the newly admitted connection (step 560). The process then exits until a new connection request is received (step 570).

Figure 5:
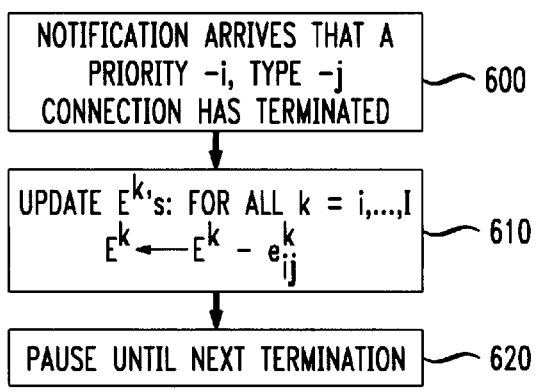
FIG. 5 shows a flowchart of an exemplary method for releasing allocated bandwidth upon termination of a connection in accordance with the present invention.

FIG. 5 shows a flowchart of an exemplary method for releasing allocated bandwidth on a link upon termination of a connection. Upon receiving notification that connection ij has terminated (step 600), the value of $E_k$ is updated, for priority classes k=i, . . . I, by subtracting for each k=i, . . . , I, the value of the effective bandwidth, $e_{ij}^k$, for the released connection from the current value of $E_k$ (step 610). The process exits and resumes when a subsequent connection is terminated.

The methods described in FIGS. 3–5 assume that the effective bandwidths have been calculated offline and remain fixed. Alternatively, however, the effective bandwidths may be adjusted based on system measurements while the call is in progress. Such effective bandwidth measurements can be accomplished in a variety of ways. For example, the value of $\psi_{A_{ij}}(\theta)$ in (5) may be estimated by the observed value:

$$\psi_{A_{ij}}(\theta) = t^{-1} e^{\theta A_{ij}(t)} \qquad (6)$$

for suitably large t. To apply (4), this estimation would need for performed for $\theta = \eta^*_k$ for all k with $i \leq k \leq I$.

Figure 6:
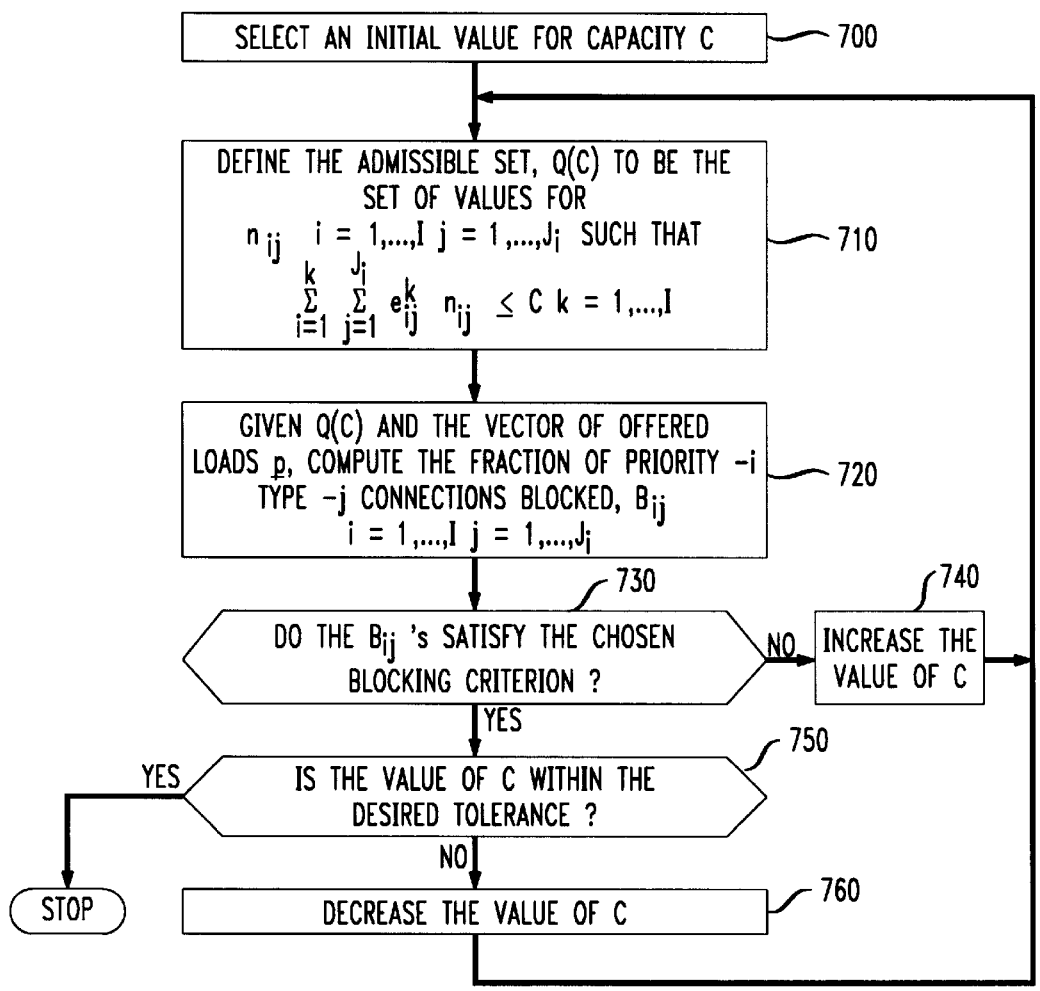
FIG. 6 shows a flowchart of an exemplary method for dimensioning a network in accordance with the present invention.

FIG. 6 shows a flowchart of an exemplary method for dimensioning a link in a network given an admissible set of numbers $n_{ij}$ of connections. The process begins by selecting an initial value for the capacity (step 700), which is subsequently iterated until a final value is reached. More specifically, the admissible set $\alpha(C)$ is the set of values $n_{ij}$ such that the set of inequalities are satisfied for the selected capacity (step 710). Given $\alpha(C)$ and the vector of offered loads $\rho$ (i.e., the $(i,j)^{th}$ offered load, $\rho_{ij}$, is the product of the arrival rate of requests for connections (i,j) and the mean holding-time of these connections), the fraction of connections (i, j) that would be blocked given this capacity is determined in accordance with known methods such as disclosed in G. Choudhury et al., *Advances in Applied Probability*, Vol. 27, 1995, pp. 1104–1143, for example (step 720). This fraction of blocked connections is measured against a predetermined blocking criterion that is provided as an input parameter (step 730). A typical blocking criterion that may be employed is that less than 1% of the connections (i,j) are blocked for each value i and j. If the blocking criterion is not satisfied, the value of the capacity C is increased (step 740) and the process begins again by defining an admissible set that satisfies inequality (2) for the newly selected capacity. Alternatively, if the blocking criterion is satisfied, the method determines whether the capacity is within a desired tolerance range (step 750). If the capacity is within the desired tolerance, the method is complete. If the capacity is not within the desired tolerance, the capacity is decreased and the method repeats for the new value of the capacity.

The present inventors have recognized that set of I constraints in (2) for a single link based on I priority levels is equivalent to the set of I constraints associated with a network of I links using the FIFO service discipline. Thus, previous methods for dimensioning FIFO networks, such as shown in the Choudhury reference mentioned above, can be applied to priority networks. With priority networks, there are I constraints for each resource (e.g., link) in the network.

As previously mentioned, the effective bandwidths may be determined in accordance with a variety of methods such as the EBEB approximation of equation (4). However, other methods may be more applicable in certain circumstances. For example, if the network employs Asynchronous Transfer Mode (ATM) technology that uses the Statistical Bit Rate (SBR) transfer capability, the effective bandwidths may be determined in terms of conventional traffic descriptors such as the Peak Cell Rate (PCR) and the Sustainable Cell Rate (SCR) (see ITU Recommendation 1.371 'B-ISDN Traffic Control and Congestion Control', Geneva, May, 1996). In this case, a connection (i,j) can be assigned an effective bandwidth $e_{ij}^k$ for priority level k, $k \geq i$, that is some function of the PCR's and SCR's of all existing connections and the candidate new connection with priority $k \geq i$. For example, $e_{ij}^i$ might be set equal to its PCR (denoted $PCR_{ij}$) for the connection's priority level i, while for k>i, $e_{ij}^k$ might be set equal to $\alpha_{ij}^k$ ($SCR_{ij}$) for the lower priorities k=i+1, . . . , I, where $\alpha_{ij}^k$ is a selected positive number.

One of ordinary skill in the art will recognize that the applicability of present invention is not limited to packet communications networks. Rather, the invention is equally applicable to other resource sharing systems in which a priority status is assigned to something other than a data packet.

What is claimed is:

1. A method for admitting a new connection having a given service priority level in a packet communications network that includes a plurality of constrained resources including switching nodes and transmission links, each having a capacity, said method comprising the steps of:

generating, for each constrained resource that may be selected to effect said new connection, and for each service priority level, a total effective bandwidth represented by a sum of individual effective bandwidths of previously admitted connections;

determining a plurality of effective bandwidths for said new connection, said plurality of effective bandwidths respectively being associated with said given service priority level and lower service priority levels, and being based on a loss criterion;

admitting said new connection if constrained resources can be selected from among those of said constrained resources for which said step of generating developed said total effective bandwidth, such that for each of the selected resources, for said given priority level of said new connection and for all lower priority levels, the sum of said total effective bandwidth and said determined effective bandwidth is less than said capacity.

2. The method of claim 1 wherein said plurality of effective bandwidths of said new connection is based on a network end-to-end delay criterion.

3. The method of claim 1 wherein said plurality of effective bandwidths of said new connection is determined in accordance with an empty-buffer effective bandwidth (EBEB) approximation.

4. The method of claim 1 wherein said determining step includes the step of
retrieving from a database previously calculated values of said plurality of effective bandwidths of said new connection.

5. The method of claim 1 wherein said determining step includes the step of obtaining measured values for said plurality of effective bandwidths of said new connection.

6. The method of claim 1 wherein a plurality of said effective bandwidths of at least one type of a new connection have the same value.

7. The method of claim 1 wherein admitted connections and said new connection are classified into source-types such that connections of a given source-type and a given service priority level have the same respective values for said plurality of effective bandwidths.

8. The method of claim 1 wherein at least one of said transmission links is defined in terms of the portion of bandwidth on a transmission path that is dedicated to said connections.

9. A method for updating bandwidths upon releasing a connection in a packet communications network that includes a plurality of switching nodes interconnected by transmission links having a capacity, said method comprising the steps of:

receiving a request to terminate a connection having a specified level of service priority;

for said specified level of service priority and for each service priority level therebelow, accessing a total effective bandwidth represented by a sum of effective bandwidths of previously admitted connections, accessing a plurality of effective bandwidths for said connection to be terminated, said plurality of effective bandwidths respectively representing said specified level of service priority and service priority levels therebelow;

for said specified level of service priority and for each service priority level therebelow, generating an updated total effective bandwidth by subtracting, for said connection to be terminated, the effective bandwidth for the given service priority level; and releasing said connection to be terminated wherein said plurality of effective bandwidths of said new connection is based on a loss criterion.

10. The method of claim 9 wherein said plurality of effective bandwidths of said new connection is based on a delay criterion.

11. The method of claim 9 wherein said plurality of effective bandwidths of said new connection is determined in accordance with an empty-buffer effective bandwidth approximation.

12. The method of claim 9 wherein said accessing step includes the step of retrieving from a database previously calculated values of said plurality of effective bandwidths of said new connection.

13. The method of claim 9 wherein admitted connections and said released connection are classified into source-types such that connections of a given source-type and a given service priority level have the same values for said plurality of effective bandwidths.

14. The method of claim 9 wherein at least one of said transmission links is defined in terms of the portion of bandwidth on a transmission path that is dedicated to said connections.

15. A method for dimensioning a link in a packet communications network given: (i) an initial value for capacity of the link, (ii) a classification of possible connections into a given specified level of service priority and source type, (iii) a plurality of effective bandwidths for each said classified connection, said plurality of effective bandwidths respectively being associated with said connection's service priority level and service priority levels therebelow (iv) an offered load vector for said classification of connections, and (v) a blocking criterion, said method comprising the steps of:

a. for the capacity of said link and the said plurality of effective bandwidths for each said classified connection, determining an admissible set of said connections;

b. determining the fraction of connections that are blocked for each service priority level and each source type, given said admissible set and said offered load vector;

c. repeating steps (a)–(b) wherein said link capacity is increased if said fraction of blocked connections exceeds said blocking criterion and said link capacity is decreased if said blocking criterion is satisfied until an incremental decrease in said capacity would cause said blocking criterion to be violated.

16. The method of claim 15 wherein said fraction of connections determined in step (b) is determined in accordance with an algorithm employed in a FIFO network.

17. The method of claim 10 wherein said link is defined in terms of the portion of bandwidth on a transmission path to be dedicated to the said connections.

18. A method for admitting new requests for service in a shared resource having a capacity, said new requests having service priority levels, said method comprising the steps of:

generating, for each service priority level on said shared resource, a total effective bandwidth represented by a sum of individual effective bandwidths of previously admitted requests for service;

subsequent to receiving a new request for service having a specified priority of service level, accessing a plurality of effective bandwidths for said new request, said plurality of effective bandwidths respectively being associated with said specified service priority level and service priority levels therebelow; and admitting said new request if, for said specified service priority level and for each said service priority level therebelow, the sum of (i) said total effective bandwidth for a given service priority level and (ii) for said new request, the said effective bandwidth at said given service priority is less than said capacity wherein said plurality of effective bandwidths of said new request for service is based on a loss criterion.

19. The method of claim 18 wherein said plurality of effective bandwidths of said new request for service is based on a delay criterion.

20. The method of claim 18 wherein said plurality of effective bandwidths of said new request for service is determined in accordance with an empty-buffer effective bandwidth (EBEB) approximation.

21. The method of claim 18 wherein said accessing step includes the step of retrieving from a database previously calculated values of said plurality of effective bandwidths of said new request for service.

22. The method of claim 18 wherein said accessing step includes the step of obtaining measured values for said plurality of effective bandwidths of said new request for service.

23. The method of claim 18 wherein said shared resource is a packet communications network.

24. A method for updating occupancy of a shared resource upon releasing a service having a specified level of service priority, in the shared resource having a capacity, said method comprising the steps of:

receiving a request to terminate said service;

for said specified level of service priority and for each service priority level therebelow, accessing a total effective bandwidth represented by a sum of effective bandwidths of previously admitted services, and accessing a plurality of effective bandwidths for said service to be terminated, said plurality of effective bandwidths respectively representing said specified level of service priority and service priority levels therebelow;

generating an updated total effective bandwidth by subtracting from said sum said plurality of effective bandwidths accessed in said step of accessing; and releasing said service to be terminated wherein said plurality of effective bandwidths of said service is based on a loss criterion.

25. The method of claim 24 wherein said plurality of effective bandwidths of said service is based on a delay criterion.

26. The method of claim 24 wherein said plurality of effective bandwidths of said service is determined in accordance with an empty-buffer effective bandwidth approximation.

27. The method of claim 24 wherein said accessing step includes the step of retrieving from a database previously calculated values of said plurality of effective bandwidths of said service.

28. A method for dimensioning a shared resource given: (i) an initial value for capacity of the shared source, (ii) a classification of service requests into a given specified level of service priority and source type, (iii) a plurality of effective bandwidths for each of said service requests, where said plurality of effective bandwidths for a service request respectively being associated with a service priority level of said service request and service priority levels lower than the service priority level of said service request (iv) an offered load vector for said classification of service requests, and (v) a blocking criterion, said method comprising the steps of:

a. for said capacity and said plurality of effective bandwidths for each of said classified service requests, determining an admissible set of said connections;

b. determining a fraction of service requests that are blocked for each service priority level and each source type, given said admissible set and said offered load vector;

c. repeating steps (a)–(b) wherein said capacity is increased if said fraction of blocked requests exceeds said blocking criterion and said capacity is decreased if said blocking criterion is satisfied until an incremental decrease in said capacity would cause said blocking criterion to be violated.

29. The method of claim 28 wherein said fraction of service requests determined in step (b) is determined in accordance with an algorithm employed in a FIFO network.

* * * * *